(12) United States Patent
Hara et al.

(10) Patent No.: US 7,529,058 B2
(45) Date of Patent: May 5, 2009

(54) TRACK PITCH EXAMINATION METHOD OF STORAGE APPARATUS, PROGRAM, AND STORAGE APPARATUS

(75) Inventors: Takeshi Hara, Kawasaki (JP); Hiroshi Oyabu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/880,170

(22) Filed: Jul. 20, 2007

(65) Prior Publication Data
US 2007/0263312 A1 Nov. 15, 2007

Related U.S. Application Data

(63) Continuation of application No. PCT/JP2005/003306, filed on Feb. 28, 2005.

(51) Int. Cl.
*G11B 5/596* (2006.01)
(52) U.S. Cl. .................. 360/77.06; 360/69; 360/31
(58) Field of Classification Search ................ None
See application file for complete search history.

(56) References Cited

U.S. PATENT DOCUMENTS 6,181,504 B1   1/2001   Ahn

2002/0044370 A1*   4/2002   Min et al. ............... 360/31
2005/0185319 A1*   8/2005   Liu et al. ............. 360/77.04
2006/0023344 A1*   2/2006   Kurihara et al. ....... 360/77.08

FOREIGN PATENT DOCUMENTS

| DE | 197 13 451 | 12/1997 |
|----|------------|---------|
| JP | 06-267212 | 9/1994 |
| JP | 07-078430 | 3/1995 |
| JP | 2000-293946 | 10/2000 |
| JP | 2003-331545 | 11/2003 |

* cited by examiner

*Primary Examiner*—Jason C Olson
(74) *Attorney, Agent, or Firm*—Greer, Burns & Crain, Ltd.

(57) ABSTRACT

Track pitches of all the tracks of a disk medium provided in a storage apparatus are examined in a manufacturing examination step. First of all, a target position path which varies a target track position so that the position crosses the tracks is generated, and a head actuator is subjected to feedback control so that head detection positions track the target position path. Track pitch abnormality is determined when an error between the target position path and the head detection positions exceeds a predetermined threshold value, and the track number is recorded in a track skip table of the medium. As the target position path, a target position sine-wave path having the amplitude of the width of plural tracks is generated in synchronization with rotation of the medium. As another target position path, a target position straight-line path which passes each track interval in certain time between the outermost and the innermost of the medium is generated.

17 Claims, 17 Drawing Sheets

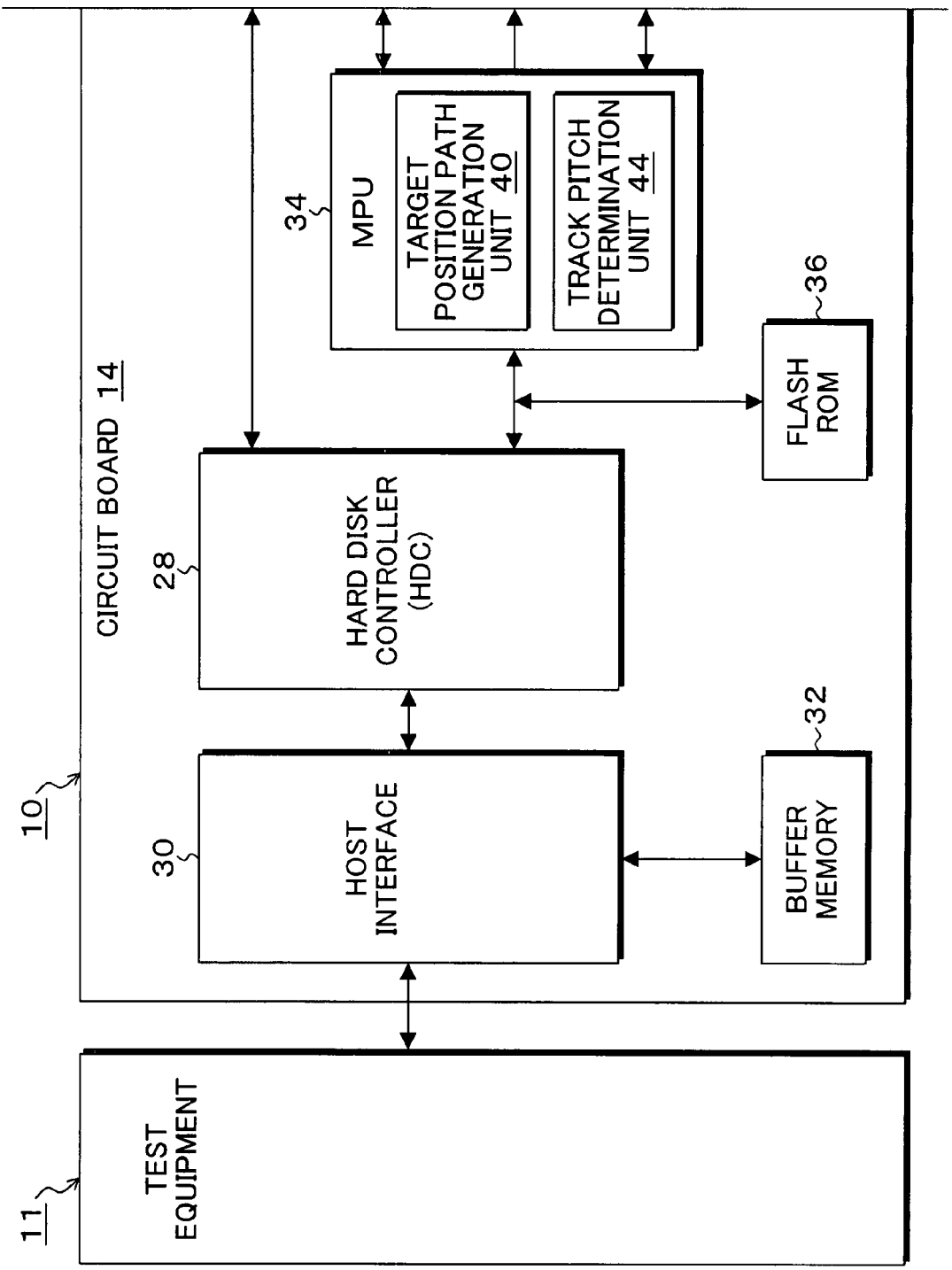

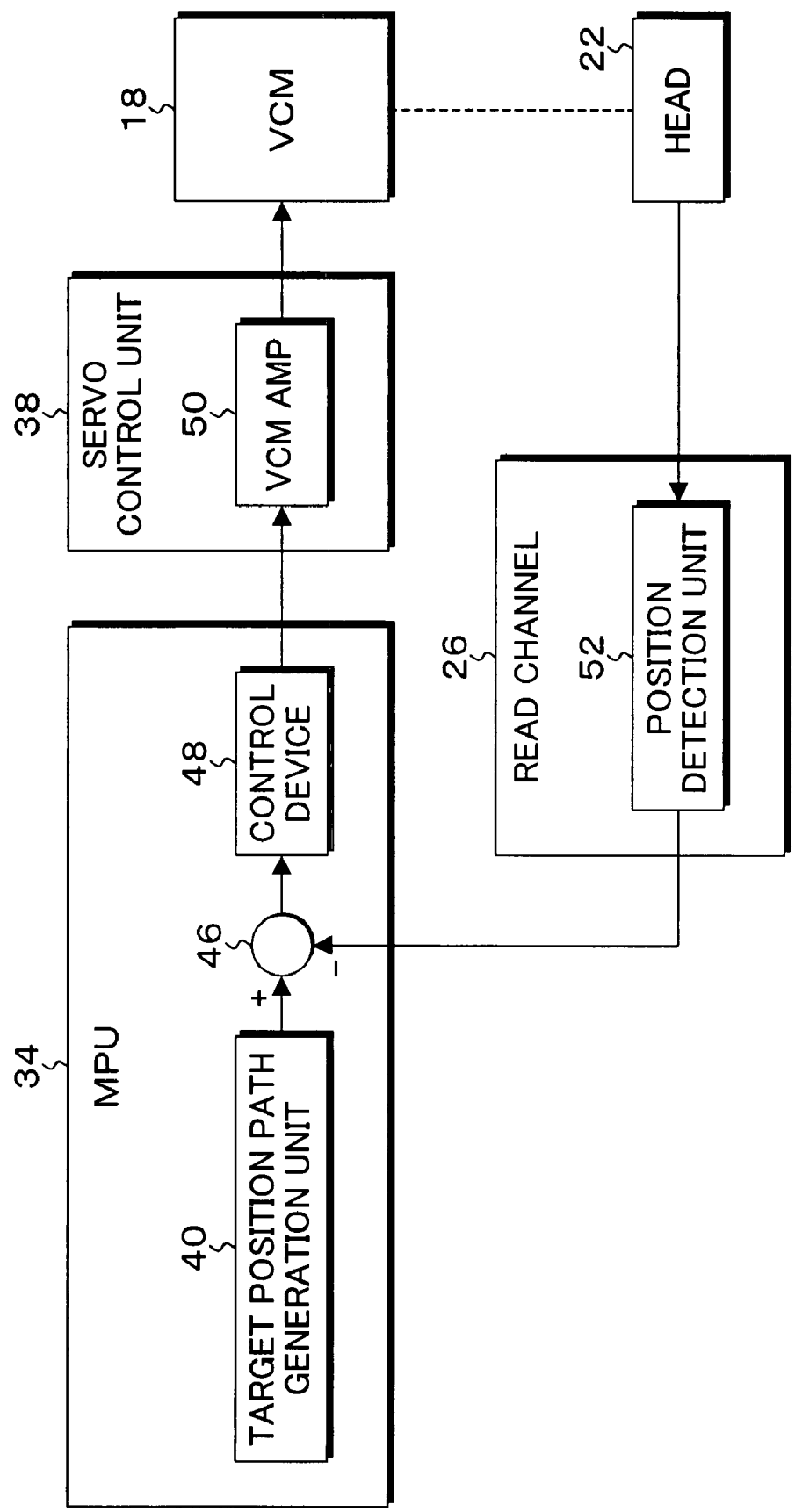

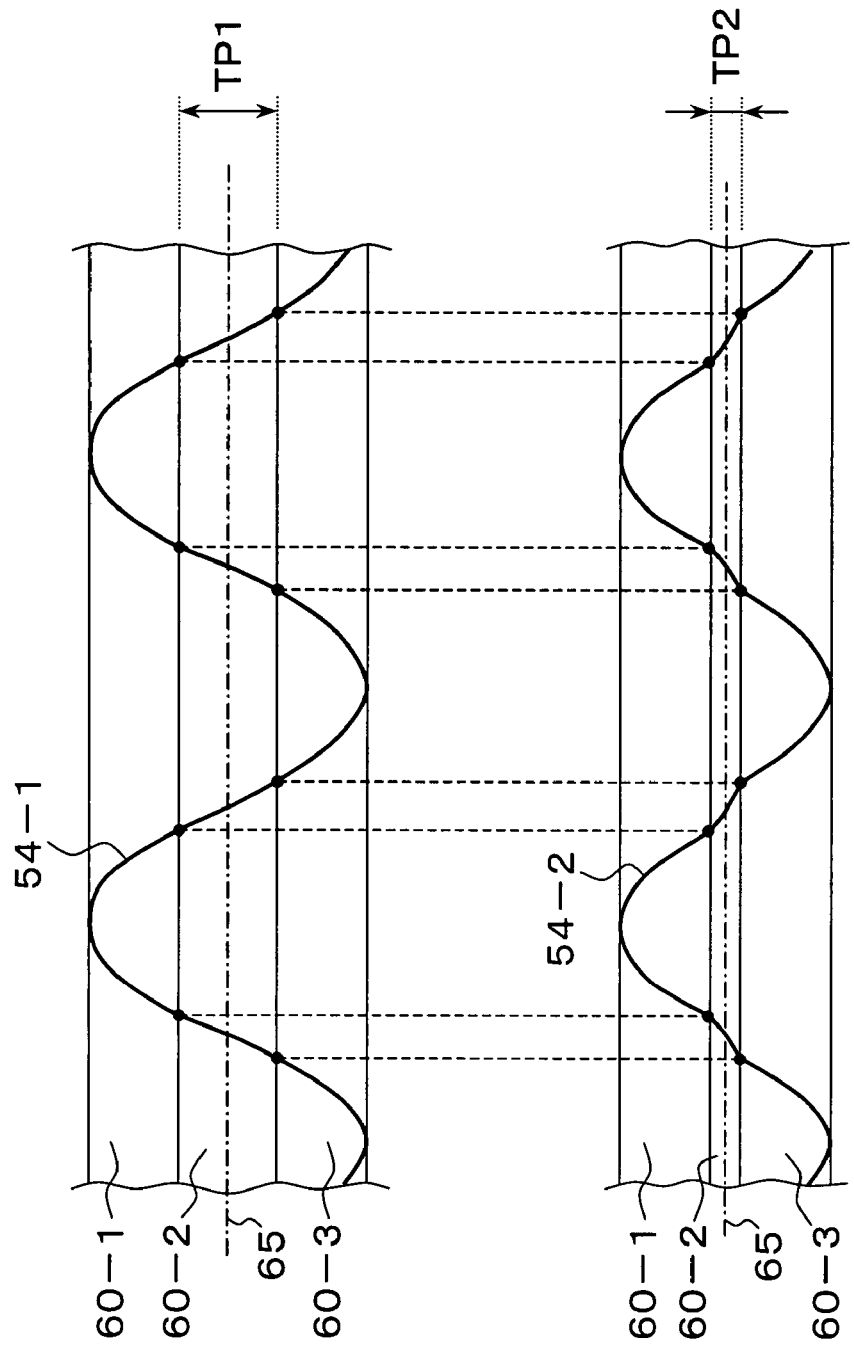

SWING AMOUNT

SWING AMOUNT

SWING AMOUNT

TRACK PITCH EXAMINATION METHOD OF STORAGE APPARATUS, PROGRAM, AND STORAGE APPARATUS

This application is a continuation of PCT/JP2005/003306, filed Feb. 28, 2005.

TECHNICAL FIELD

The present invention relates to a track pitch examination method, a program, and a storage apparatus which examine track pitches of a disk medium and, particularly, relates to a track pitch examination method, a program, and a storage apparatus which examine the pitches of all the tracks of the disk medium.

BACKGROUND ART

Conventionally, in a manufacturing process of a magnetic disk apparatus, servo track writer equipment sets a track recording density TPI, i.e., track pitches by which a required recording capacity can be obtained on a magnetic disk medium to write servo tracks. When the servo tracks are to be written, the track pitches have to be determined according to the write core width of a head so that adjacent tracks are not erased; however, in addition to that, in consideration of pitch errors between the tracks upon servo track write, they are determined so that the track pitches tend to be wide. Moreover, in a conventional processing process of servo track write, as an examination in the process, whether read/write can be correctly performed on the tracks per se is examined.

Patent Document 1: Japanese Patent Application Laid-Open (kokai) No. 2003-331545

Meanwhile, recently, the more the track density is increased along with miniaturization of a write core and a read core, the more the track pitches are narrowed; therefore, the influence of variations which are generated when the servo tracks are written in the servo track writer equipment becomes large.

However, although the tracks per se are examined as the examination in the process such as that of defects (medium defects), the track pitches are not examined; therefore, it may pass and be shipped with remaining narrow track pitches. In such a magnetic disk apparatus, the narrow tracks may be written over by write of adjacent tracks after shipment, and the written data may become unreadable.

Meanwhile, there is a method which measures write/erase margins as a method of examining the influence of write of adjacent tracks. In the write/erase margins, after test data is written to an objective track, different test data is written to an adjacent track, the objective track is read, and, when the read can be performed, the adjacent track is written so that the objective track is narrowed, thereby measuring the writing limit through narrowing by the adjacent track. However, in the measurement of the write/erase margin, the error rate of the objective track is obtained while performing the narrowing write of the adjacent track, and measurement of one track takes considerable time. Therefore, there is a problem that it cannot be applied to examination of abnormality, in which the track pitches are narrow, with respect to the entire surface of the magnetic disk medium since productivity is significantly impaired.

DISCLOSURE OF THE INVENTION

According to the present invention to provide a track pitch examination method of a storage apparatus, a program, and the storage apparatus which can efficiently examine track pitches of an entire medium surface in a short period of time.

The present invention provides a track pitch examination method of a storage apparatus. The track pitch examination method of the present invention is characterized by including a target position path generation step of generating a target position path which varies a target track position so that the position crosses a track;

a head position control step of subjecting a head actuator to feedback control so that a head detection position tracks the target position path; and a track pitch determination step of determining track pitch abnormality when an error between the target position path and the head detection position exceeds a predetermined threshold value.

In a specific embodiment of the present invention, in the target position path generation step, as the target position path, a target position sine-wave path which has an amplitude of the width of one or plural tracks and causes a target track position to undergo sine variation in plural cycles per one rotation of a medium is generated;

in the head position control step, the head actuator is subjected to feedback control so that the head detection position tracks the target position sine-wave path; and in the track pitch determination step, the error between the target position sine-wave path and the head detection position is detected, and track pitch abnormality is determined with respect to a track at which the error exceeds a predetermined threshold value.

Herein, in the target position path generation step, each of target track positions of the target position sine-wave path is generated in synchronization with a servo frame; and, in the track pitch determination step, the head detection position synchronized with each of the target track positions is extracted so as to detect the error, and track pitch abnormality is determined with respect to the track at which the error exceeds a predetermined threshold value.

Moreover, in the target position path generation step, each of target track positions of the target position sine-wave path is generated in synchronization with a servo frame; in the track pitch determination step, the head detection positions synchronized with the target track positions are extracted with respect to one rotation of the medium and averaged, and track pitch abnormality is determined with respect to a track at which an error between the average head detection position and the target position sine-wave path exceeds a predetermined threshold value.

Furthermore, the track pitch determination step may be configured so that, after the components of the head detection positions synchronized with the target track positions of the target position sine-wave path are extracted with respect to one rotation of the medium and averaged, root mean square of the average head detection position obtained in plural rotations of the medium is obtained, and track pitch abnormality is determined with respect to a track at which an error between the root mean square and the target position sine-wave path components exceeds a predetermined threshold value.

In another specific embodiment of the present invention, in the target position path generation step, as the target position path, a target position straight-line path which varies a target track position so that the position crosses each track interval in a certain time between the outermost side and the innermost side of a medium is generated;

in the head position control step, the head actuator is subjected to feedback control so that the head detection position tracks the target position straight-line path; and in the track pitch determination step, track pitch abnormality is determined with respect to a track at which an error between the target position straight-line path and the head detection position exceeds the threshold value.

Herein, in the target position path generation step, a target position straight-line path is generated plural times between the outer and the inner; and, in the track pitch determination step, the head detection positions obtained in plural times of generation of the target position straight-line path are averaged, and track pitch abnormality is determined with respect to a track at which an error between the target position straight-line path and the average head detection position exceeds a predetermined threshold value.

Moreover, in the track pitch determination step, the head detection positions each of which is obtained in each of the predetermined number of times of generation of the target position straight-line path are averaged, root mean square of the average head position which is obtained by repeating the predetermined number of times of path generation is obtained, and track pitch abnormality is determined with respect to a track at which an error between root mean square and the target position straight-line path exceeds a predetermined threshold value.

Furthermore, the abnormal track determined in the track pitch determination step is recorded in a medium as track skip information.

The present invention provides a track pitch examination program of a storage apparatus. The program of the present invention is characterized by causing a computer of the storage apparatus to execute a target position path generation step of generating a target position path which varies a target track position so that the position crosses a track;

a head position control step of subjecting a head actuator to feedback control so that a head detection position tracks the target position path; and a track pitch determination step of determining track pitch abnormality when an error between the target position path and the head detection position exceeds a predetermined threshold value.

The present invention provides a storage apparatus. The storage apparatus of the present invention is characterized by having a target position path generation unit which generates a target position path which varies a target track position so that the position crosses a track;

a head position control unit which subjects a head actuator to feedback control so that a head detection position tracks the target position path; and a track pitch determination unit which determines track pitch abnormality when an error between the target position path and the head detection position exceeds a predetermined threshold value.

In the present invention, a storage apparatus which performs access to data with respect to a track of a storage medium is characterized in that, when an abnormal track in which a track pitch is abnormal is present, track skip information for performing control by a control unit so as to track-skip the abnormal track is recorded in an administrative information area of the storage medium.

Note that, details of the program and the storage apparatus according to the present invention are basically same as the case of the track pitch examination method of the present invention.

According to the present invention, abnormality of a track pitch is determined when the fluctuation amount serving as the error which is obtained when a target position sine-wave path or a target position straight-line path is generated and a head is subjected to tracking control is large, and track pitches can be examined on plural tracks in one measurement; thus, the tracks on the entire medium surface can be efficiently examined in short time.

Therefore, abnormal tracks having narrow track pitches caused along with miniaturization of the track pitches can be reliably detected; and, when they are stored in the medium as track skip information, errors due to abnormal tracks can be prevented, and reliability and performance of the storage apparatus can be improved.

Moreover, when the target position sine-wave path is used, the track pitches corresponding to one rotation of the medium are examined; therefore, also, the tracks partially having narrow track pitches can be reliably determined as abnormal tracks and skipped.

Even when there are abnormal track pitches, control that access such as recording/reproducing is not performed with respect to the abnormal tracks can be performed. Moreover, although slight reduction in the storage capacity is problematic, it is a usable conforming product as a product when it satisfies a specified storage capacity, and the effect in the production improving the ratio of the conforming products is the effect having a higher priority than the storage capacity. As a matter of course, it goes without saying that use of those having a large number of abnormal tracks in the level that affects it to be a large-capacity memory is avoided as defective products.

BRIEF DESCRIPTION OF DRAWINGS

FIGS. 1A and 1B are block diagrams of a magnetic disk apparatus to which a track pitch examination of the present invention is applied;

FIG. 2 is an explanatory diagram of a feedback control function by the magnetic apparatus of FIGS. 1A and 1B;

FIGS. 4A and 4B are explanatory diagrams of a target position sine-wave path generated in a track pitch examination process of the present invention;

BEST MODE FOR CARRYING OUT THE INVENTION

Figure 1B:
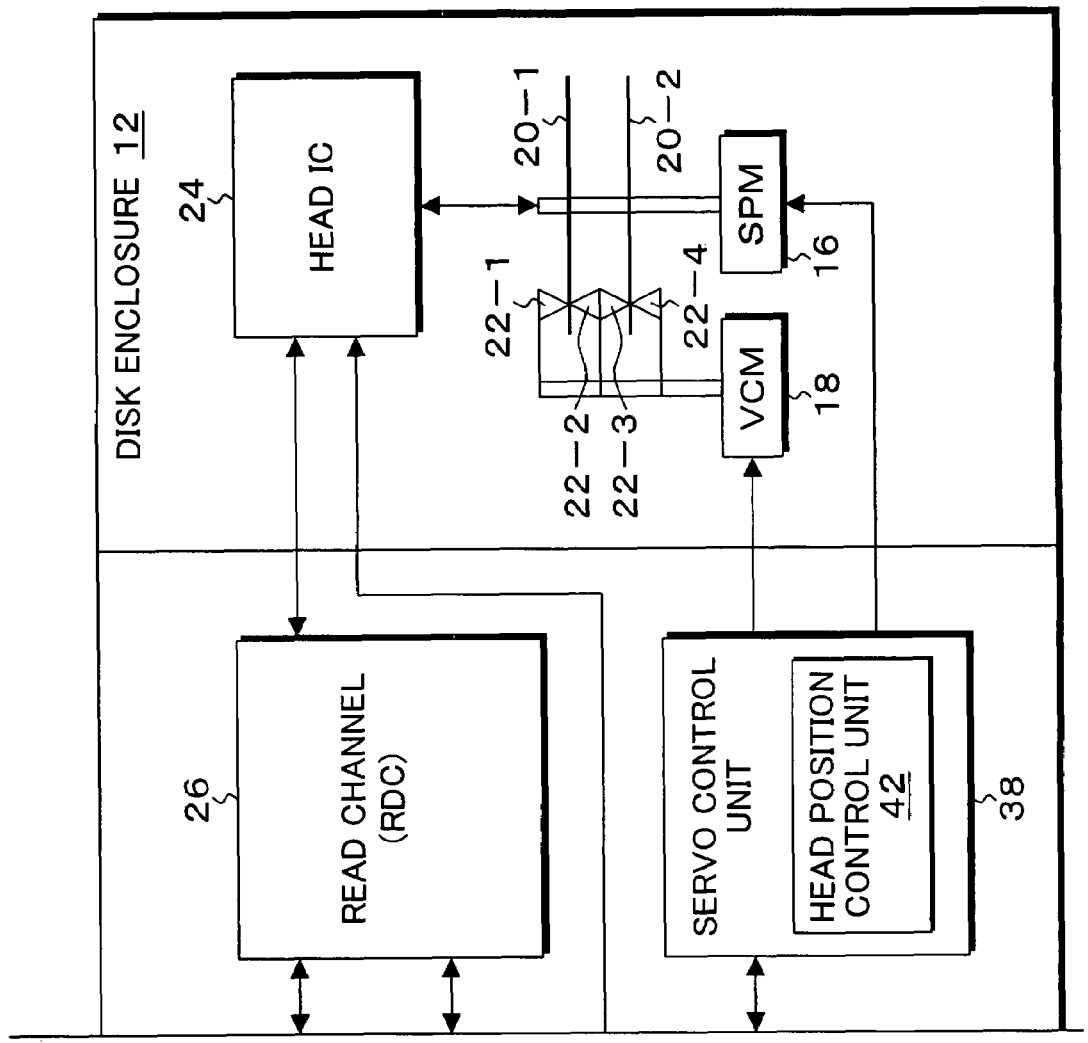

FIGS. 1A and 1B are block diagrams of a magnetic disk apparatus to which a track pitch examination process of the present invention is applied. In FIGS. 1A and 1B, the magnetic disk apparatus 10 known as a hard disk drive (HDD) is composed of a disk enclosure 12 and a circuit board 14. In the disk enclosure 12, a spindle motor 16 is provided, and disk media 20-1 and 20-2 are attached to a rotating shaft of the spindle motor 16 and rotated for a certain period of time at, for example, 4200 rpm. A voice coil motor 18 is provided in the disk enclosure 12, the voice coil motor 18 has heads 22-1 to 22-4 loaded on distal ends of arms of a head actuator thereof so as to perform positioning of the heads with respect to the recording surfaces of the disk media 20-1 and 20-2. Note that, in the heads 22-1 to 22-4, write heads and read heads are loaded in the manner that they are integrated. The heads 22-1 to 22-4 are connected to a head IC 24 by signal lines, and the head IC selects any one of the heads which performs write or read in accordance with a head select signal based on a write command or a read command from a host serving as an upper-level apparatus. In the head IC 24, a write amplifier is provided for a write system, and a preamplifier is provided for a read system. In the circuit board 14, a read channel 26, a hard disk controller 28, a host interface 30, a buffer memory 32, a MPU 34, and a flash ROM 36 are provided. In such magnetic disk apparatus 10, at the stage when assembly in the manufacturing line of the disk enclosure 12 is completed, servo information is written to the recording surfaces of the disk media 20-1 and 20-2 by servo track write equipment, and, after the apparatus is completed by combining it with the circuit board 14 thereafter, it is connected to test equipment 11 so as to perform a test process. In the state in which the magnetic disk apparatus 10 is connected, the test equipment 11 downloads programs for testing to, for example, the flash ROM 36, and the CPU 34 executes the programs for testing downloaded to the flash ROM 36 so as to perform necessary test processes. The programs for testing downloaded from the test equipment 11 include a track pitch examination program for the track pitch examination process according to the present invention. When the track pitch examination program downloaded from the test equipment 11 is executed by the MPU 34, the functions of a target position path generation unit 40 and a track pitch determination unit 44 are generated in the MPU 34, and the function of a head position control unit 42 for feedback control by a servo control unit 38 by driving the voice coil motor 18 as a servo actuator is generated. The target position path generation unit 40 generates target position paths which change target track positions so that they intersect tracks on a recording surface of a disk medium serving as a test object. As the target position paths generated by the target position path generation unit 40, any of (1) target position sine-wave path and
(2) target position straight-line path is used in the embodiment of the present invention.

The target position sine-wave path has an amplitude A corresponding to the width of one or a plurality of tracks on the recording surface of the disk medium serving as the examination object and generates a target position path which causes the target track position to undergo sine variation in a predetermined number of plural cycles per one medium rotation. On the other hand, the target position straight-line path varies the target head position so that it crosses each track interval in certain time between the outermost side and the innermost side of the disk medium. The head position control unit 42 subjects the voice coil motor 18, which functions as the head actuator, to feedback control so that the head detection position tracks the target position path generated by the target position path generation unit 40. Regarding detection of the head position which is required for the feedback control of the head position control unit 42, for example, when the recording surface wherein the head 22-1 of the disk medium 20-1 is used is taken as an example, servo information read from the recording surface by the head 22-1 is demodulated via the head IC 24 and the read channel 26 so as to detect the track position by the MPU 34, the track detection position is given to the servo control unit 38, and the voice coil motor 18 is subjected to the feedback control so that the deviation from the target position path becomes 0. The track pitch determination unit 44 determines track pitch abnormality when the error between the target position path and the head detection position exceeds a predetermined threshold value. In the track pitch examination of the present invention, the head detection position is caused to perform tracking by controlling the voice coil motor 18 by the head position control unit 42 so that the target position path generated by the target position path generation unit 40 is attained, and, when the track pitches have correct intervals, the head detection position tracks the target position path. However, when the track pitch is narrower than a normal interval, the corresponding positions on the medium in the case in which a target position path is generated for the narrow track forms an irregular shape, an error which causes a large fluctuation amount since the head cannot perform tracking, and it is determined as an abnormal track having a narrow track pitch when the error exceeds a specified threshold value.

FIG. 2 is an explanatory diagram of a feedback control mechanism which is formed upon the track pitch examination by the magnetic disk apparatus of FIGS. 1A and 1B. In FIG. 2, the target position path generation unit 40 is provided in the MPU 34, a target head position of the target position path output from the target position path generation unit 40 is input to an adder unit 46, it is compared with a head detection position which is detected by a position detection unit 52 provided in the read channel 26 and based on read of the servo information of the disk medium performed by the head 22, and the error (deviation) therebetween is input to a control device 48. The control device 48 outputs a current indication value, which is calculated in accordance with the error, to a VCM amplifier 50 provided in the servo control unit 38 and causes a drive current to flow through the voice coil motor 18, thereby subjecting the head 22 to tracking control to the value of a target position path.

Figure 3:
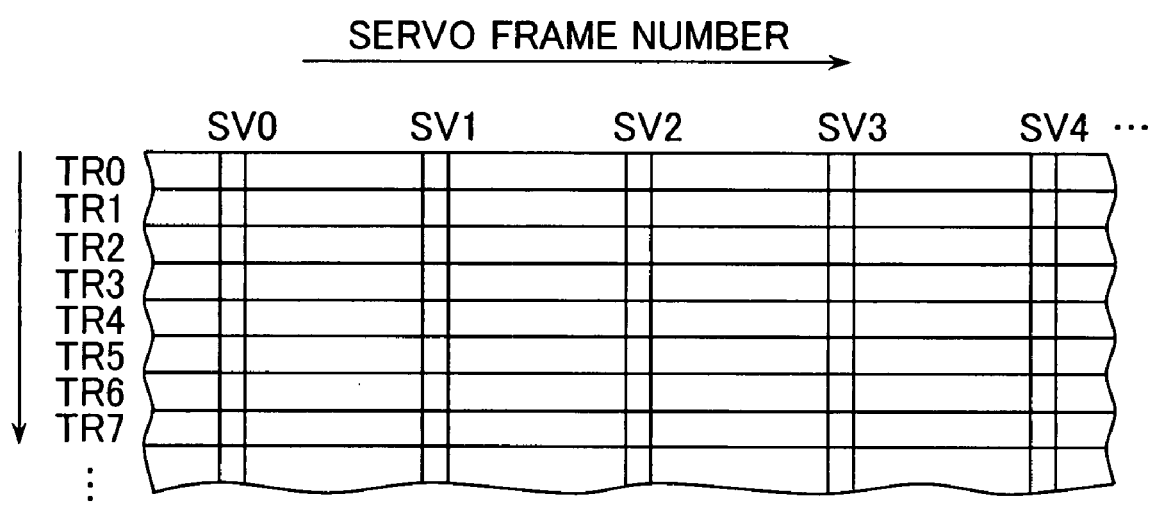
FIG. 3 is an explanatory diagram of tracks and servo frames of a disk medium.

FIG. 3 is an explanatory diagram of tracks and servo frames in the disk medium, wherein part of the disk medium is extracted and shown. In FIG. 3, although the tracks TR0, TR1, TR2, . . . are shown by straight lines for convenience of explanation, they are formed on concentric circles in the circumferential direction with respect to the medium center. In each of the tracks TR0, TR1, TR2, . . . , the servo frames SV0, SV1, SV2, SV3, SV4, . . . are written by servo track write equipment. Herein, the servo frame SV0 is a top servo frame and is different from the other servo frames in the point that it has index information indicating a rotation reference position. In the servo frames SV0, SV1, SV2, SV3, SV4, . . . , for example, binary-phase phase information (burst) is recorded so that the position of the head in the track width can be detected. Moreover, between the servo frames SV0, SV1, SV2, . . . , data frames for recording user data are disposed, and detection of the track pitches by the head is discretely performed at the timing of the servo frames. Therefore, regarding the target track positions for providing the target position path for the track pitch examination process according to the present invention, a target track position is generated in synchronization with the timing of each of the servo frames, and tracking control is performed by feeding back the head detection position simultaneously detected at this timing.

FIGS. 4A and 4B are explanatory diagrams of a target position sine-wave path generated in the track pitch examination process of the present invention. FIG. 4A shows the case in which three tracks, tracks 60-1, 60-2, and 60-3, are examined by one process, wherein each of them is assumed to have a track pitch TP1 as a correct track width.

In the track pitch examination process according to the present invention, the head 22 is placed on the track of a track center 65 of the track 60-2 at the center, and a target position sine-wave path 54-1 is generated from the timing of the servo frame which is first obtained after on-track. The target head positions of the target position sine-wave path 54-1 are discretely generated at the timing of the servo frames shown in FIG. 3, wherein, normally, the number of servo frames that enables generation of the target head positions with sufficient resolving power is provided. The target position sine-wave path 54-1 can be generated by the below expression when the track number of the track 60-2 of the track center 65 serving as a measurement object is TN, and the amplitude determined by the number of tracks serving as objective tracks is A.

(Target Position Sine-Wave Path)=Track Number
$TN+A \sin \omega t$ (1)

Note that, the value of the target position sine-wave path is expressed by a track interval wherein a track pitch TP=1. In the target position path generation unit 40 of the present invention, the target position sine-wave path provided by the expression (1) is generated by solving the calculating formula according to ($\omega t$) which provides the timing of the servo frames; alternatively, the target head positions of the target position sine-wave path are generated by referencing a table which stores the values of ($A \sin \omega t$) as addresses of the number of servo frames in advance. FIG. 4B shows a path of a target position sine-wave path on the medium in the case in which an abnormal track having a narrow track pitch is present. In FIG. 4B, among the three tracks 60-1, 60-2, and 60-3, the track pitch of the center track 60-2 is a track pitch TP2 which is narrow in the width with respect to the normal track pitch TP1 shown in FIG. 4A. When the abnormal track 60-2 having a narrow track pitch is present in this manner, the interval between the target head positions generated by the target position path generation unit 40 are narrowed; thus, an irregular shape is obtained. Therefore, although tracking could performed in the case of the correct track pitch TP1 of FIG. 4A for the position of the head, tracking cannot be performed for a target position sine-wave path 54-2 which is generated for the abnormal track 60-2 having the narrow track pitch TP2 of FIG. 4B, and the fluctuation amount thereof becomes large.

Figure 5A:
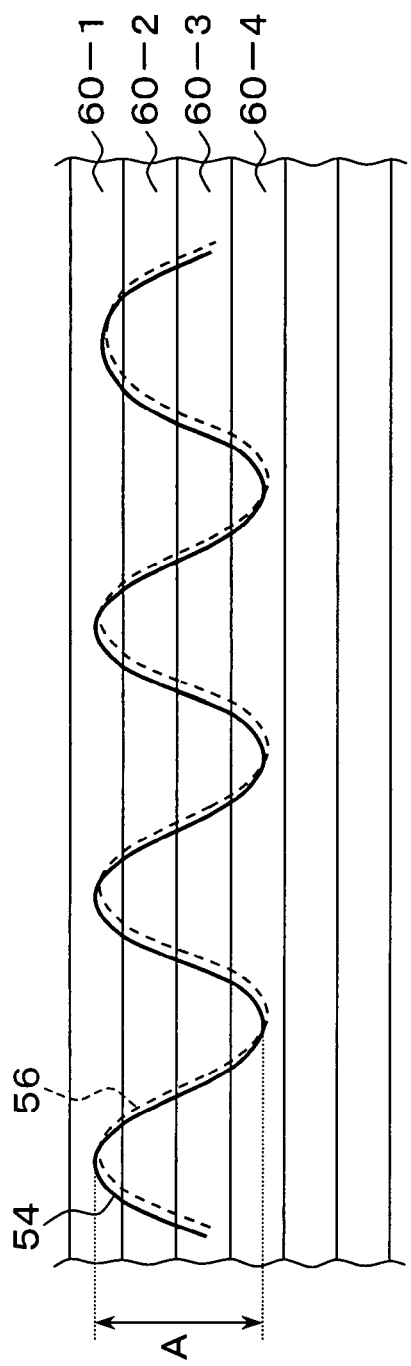
FIGS. 5A and 5B are explanatory diagrams of a target position sine-wave path and head detection positions tracking that in the case in which track pitches are normal.
Figure 5B:
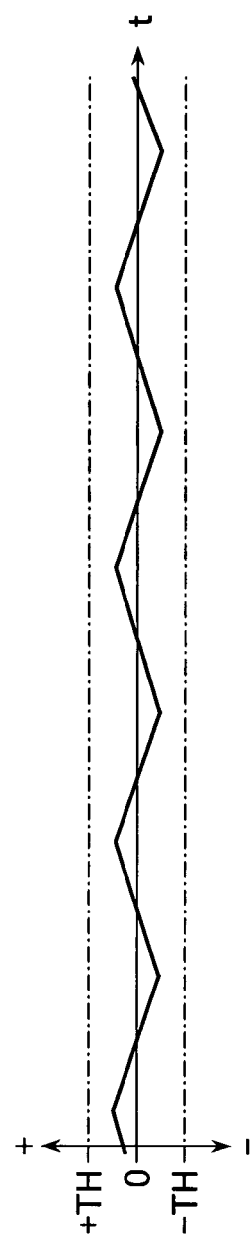

FIGS. 5A and 5B are explanatory diagrams of a target position sine-wave path in the case in which track pitches are normal and head detection positions tracking that. In FIG. 5A, the target position sine-wave path 54 for which the width corresponding to three tracks is set as the amplitude A is generated, and the head detection positions 56 shown by a broken line tracking that are detected.

Note that, in this example, the center position at which the target position sine-wave path 54 is generated is set at the boundary between the tracks 60-2 and 60-3. FIG. 5B shows the fluctuation amounts which are errors of the head detection positions 56 tracking the target position sine-wave path 54 in the case of FIG. 5A in which the track pitches are correct, wherein the fluctuation amounts are within the range of a threshold value ±TH which is set for determining track pitch abnormality.

Figure 6A:
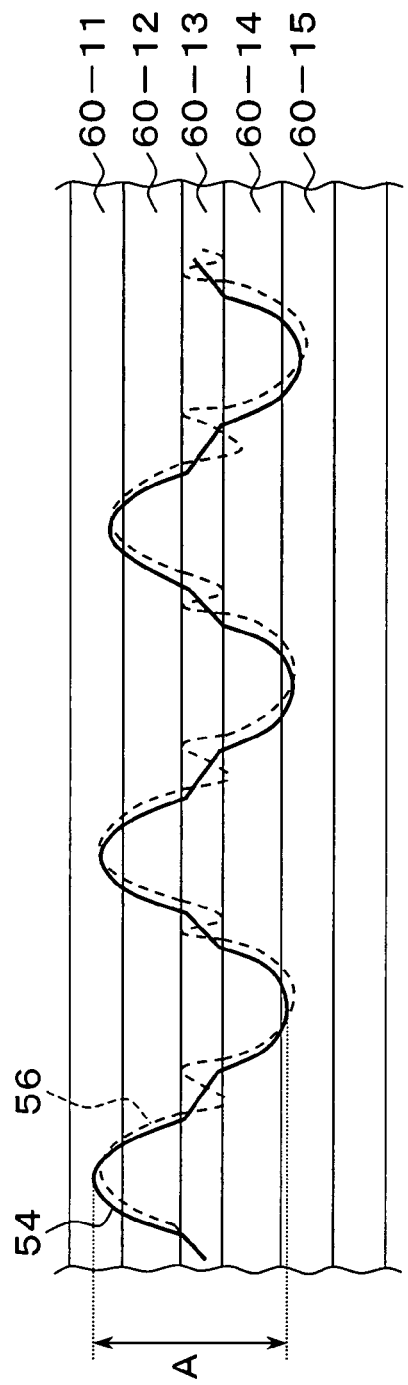
FIGS. 6A and 6B are explanatory diagrams of a target position sine-wave path and head detection positions tracking that in the case in which an abnormal track having a narrow track pitch is present.
Figure 6B:
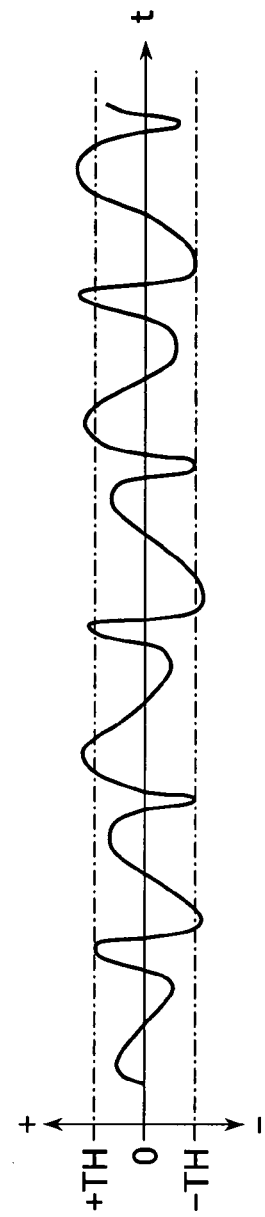

FIGS. 6A and 6B show a target position sine-wave path of the case in which an abnormal track having a narrow track pitch is present and head detection positions tracking that. In FIG. 6A, a track 60-13 has a narrow track pitch compared with other normal tracks 60-11, 60-12, 60-14, and 60-15. The target position sine-wave path 54 of the case in which the abnormal track pitch 60-13 having such a small track pitch is present generates irregular distortion in the sine waveform at the part of the abnormal track 60-13 in accordance with the narrowed track pitch. The head detection positions 56 of this case cannot track the irregular variation of the target position sine-wave path 54 in the abnormal track 60-13 and causes hunting, and the fluctuation amount is increased. Such increase in the fluctuation amount is recurrently repeated in every cycle of the target position sine-wave path 54. FIG. 6B shows the fluctuation amount indicating errors of the head detection positions 56 with respect to the target position sine-wave path 54 in FIG. 6A, wherein the fluctuation amount is largely increased at the part corresponding to the abnormal track 60-13 at which the track pitch is narrow, and it exceeds the threshold value +TH and −TH. In the present invention, the track pitch determination unit 44 of FIGS. 1A and 1B compares and determines that the fluctuation amount such as that of FIG. 6B which exceeds the threshold value +TH or −TH is generated; and, regarding the tracks which are determined to have track pitch abnormality, for example, the track addresses of the abnormal tracks are recorded in a track skip table which is stored in a system area on the disk medium.

Figure 7:
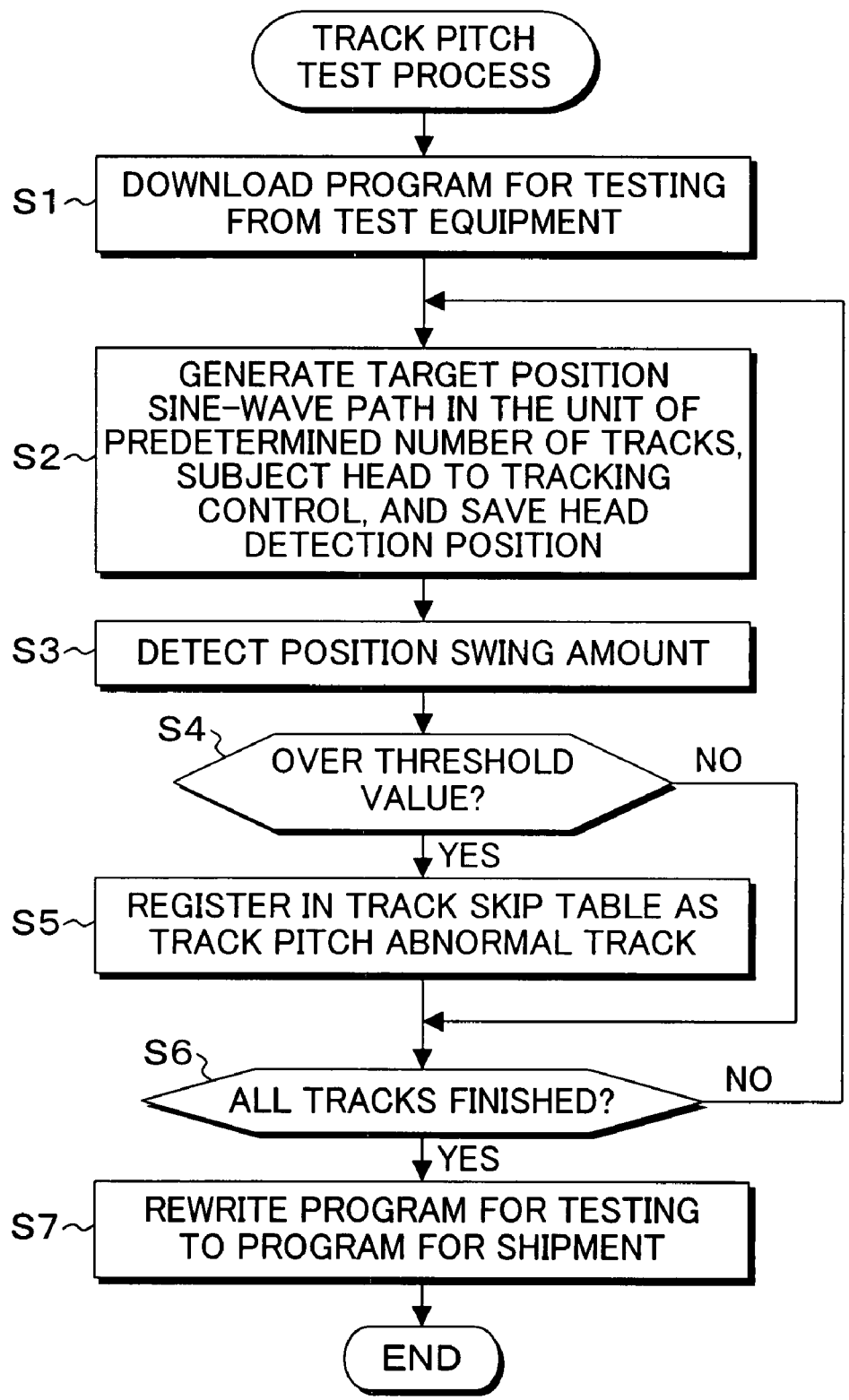
FIG. 7 is a flow chart of a track pitch examination process according to the present invention using the target position sine-wave path.

FIG. 7 is a flow chart of the track pitch examination process according to the present invention using a target position sine-wave path. In FIG. 7, in the track pitch examination process, in step S1, the programs for testing are downloaded from the test equipment 11 to the magnetic disk apparatus 10 serving as an examination object. The programs for testing include the track pitch examination program which is used in the track pitch examination process of the present invention, and it is executed. As a matter of course, the other programs for testing are also executed when the track pitch examination process of the present invention is finished. In step S2, a target position sine-wave path is generated in the unit of a predetermined number of tracks, which is set in advance, that is, the unit of the number of tracks, for example three tracks, corresponding to the amplitude which provides the target position sine-wave path, the head is subjected to feedback control so that it tracks the target position sine-wave path, and the head position is detected and saved. Detection of the head position in the case in which the head is caused to track the target position sine-wave path is performed, for example, in one rotation of the disk medium. In generation of the target position sine-wave path, the head is positioned at the center of the three tracks serving as examination objects and placed on the track, and generation of the target position sine-wave path is started from the timing of the servo frame which is obtained immediately after the on-track. Next, in step S3, for the head detection positions obtained in one rotation of the medium, the position fluctuation amount is detected as an error with respect to the target position sine-wave path. Then, in step S4, when the detected position fluctuation amount exceeds a threshold value, the track number is registered in a track skip table as a track pitch abnormal track in step S5. Subsequently, whether the processes of all the tracks are finished or not is checked in step S6; and, when unfinished, the process returns to step S2, and the process is repeated for a next processing object track. When the processes of all the tracks are finished in step S6, the program for testing is rewritten to a program for shipment in step S7, and the series of examination processes is finished. Herein, in one time of the track pitch examination process, for example, as shown in FIGS. 4A and 4B, the target position sine-wave path having the amplitude corresponding to three tracks is generated, and an abnormal track is determined when the position fluctuation amount obtained in the tracking control of the head with respect to that exceeds a threshold value; and, in this case, all of the three tracks serving as the test objects are recorded in the track skip table of a system area of the medium as abnormal tracks having narrow track widths. Therefore, when the apparatus is to be used after product shipment, a control unit (MPU/firmware) of the storage apparatus reads the track skip table of the system area provided on the medium to a memory, thereby enabling control of recording/reproduction so that abnormal tracks are not used as recoding areas. Thus, the apparatus can be used as a highly reliable product, without caring about the abnormal tracks, by the user. As is clear from FIGS. 6A and 6B, a particular track among a plurality of tracks, serving as examination objects can be detected from the timing at which the fluctuation amount exceeds the threshold value can be detected; therefore, the track corresponding to the fluctuation amount which exceeds the threshold value may be recorded in the track skip table as an abnormal track.

Figure 8A:
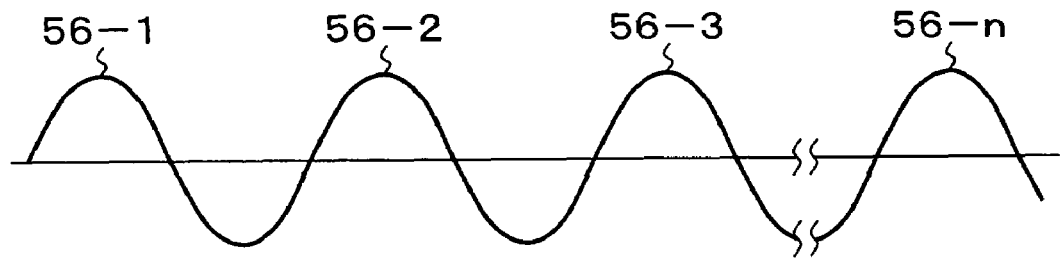
FIGS. 8A and 8B are explanatory diagrams of a process of averaging head detection positions which are synchronized with a target position sine-wave path of plural cycles generated in one rotation of the medium.
Figure 8B:
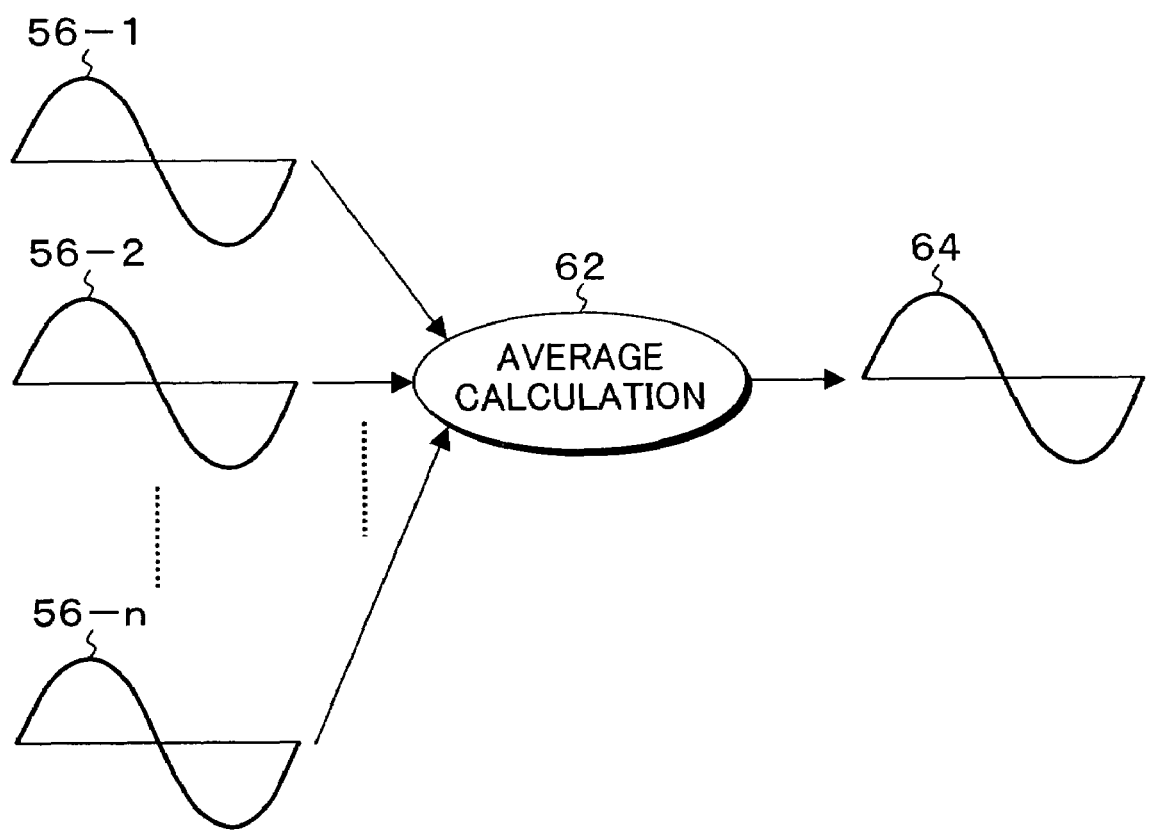

FIGS. 8A and 8B are explanatory diagrams of a process of averaging head detection positions synchronized with a target position sine-wave path of a plurality of cycles generated in one rotation of the medium. In the process of determining the abnormality in which the track pitch is narrow from the fluctuation amount by generating the target position sine-wave path according to the present invention and causing the head to track that, abnormal tracks having narrow track pitches can be determined by comparing the detected fluctuation amount with the threshold value; however, when the influence due to another rotation synchronous component or rotation asynchronous component appears at the head detection position, sometimes it is difficult to perform accurate determination.

Therefore, in the process of FIGS. 8A and 8B, with respect to the head detection positions obtained in one rotation of the medium, the detection positions are separated for each cycle, and average head detection positions are obtained. FIG. 8A shows a head position detection signal obtained in one rotation of the medium, and it is composed of cycle components 56-1 to 56-n. Therefore, as shown in FIG. 8B, it is decomposed into the cycle components 56-1 to 56-n, and an average calculation 62 is performed for the values of the corresponding detection positions, thereby calculating average head detection positions 64. The thus calculated average head detection positions 64 is compared with the target position sine-wave path which is also corresponding to one cycle, thereby obtaining the fluctuation amount corresponding to one cycle; and the fluctuation amount is compared with the threshold value, thereby determining an abnormal track having a narrow track pitch. When the head position detection signal of the plurality of cycles obtained in one rotation of the medium is decomposed and averaged in one cycle unit in this manner, errors of the head detection position detection signal due to other rotation synchronous components or rotation asynchronous components can be reduced, and the fluctuation amount can be more accurately detected so as to determine presence of the abnormality of track pitches. Note that, for the abnormality involving a partially narrow track part in one track cycle, averaging is not performed since errors become undetectable through averaging.

Figure 9:
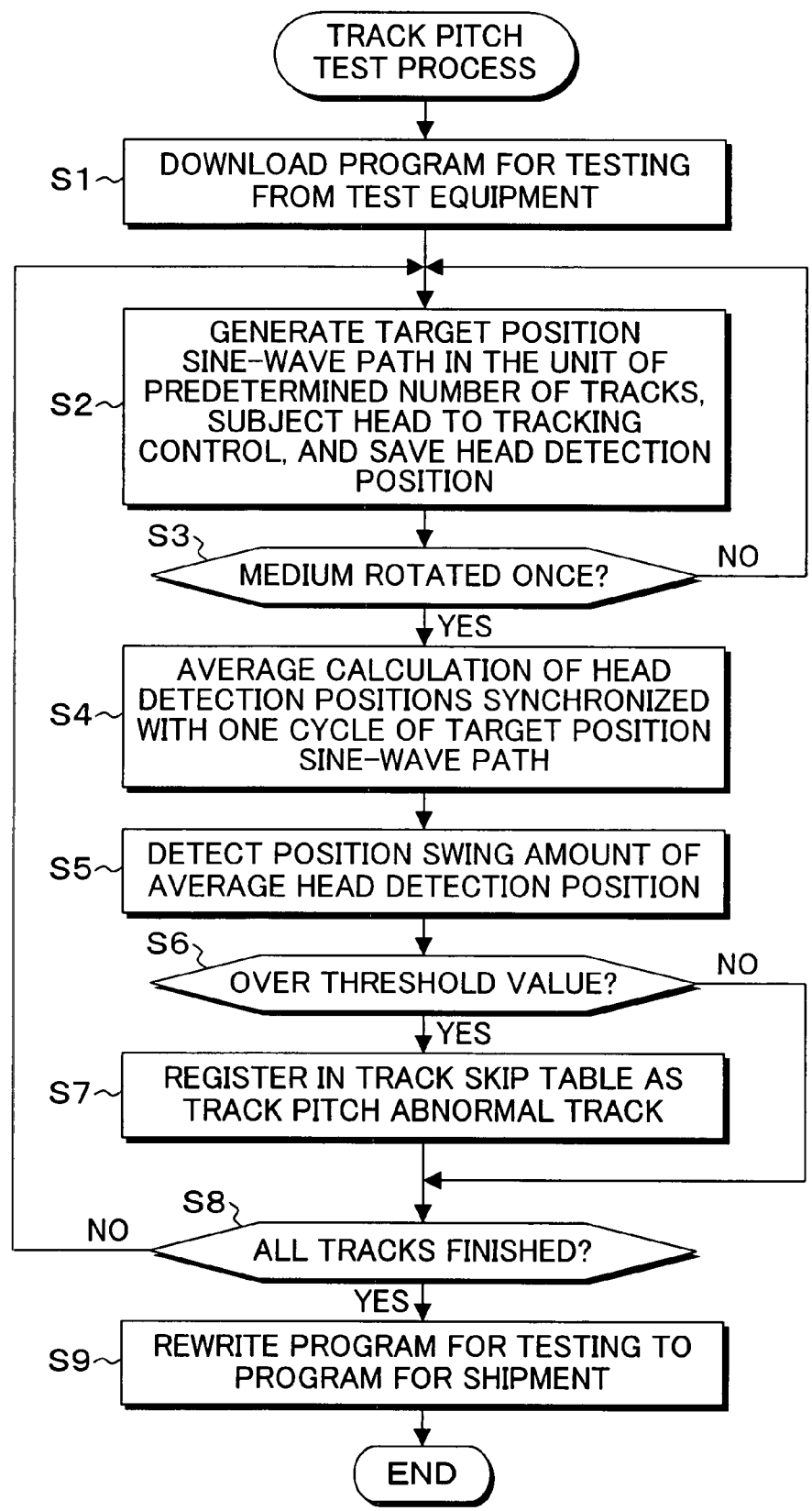
FIG. 9 is a flow chart of a track pitch examination process according to the present invention which determines abnormality from the fluctuation amount of average head detection positions tracking the target position sine-wave path of FIGS. 8A and 8B.

FIG. 9 is a flow chart of a track pitch examination process according to the present invention which determines abnormality from the fluctuation amount of average head detection positions tracking the target position sine-wave path of FIGS. 8A and 8B. In FIG. 9, in step S1, the programs for testing are downloaded from the test equipment 11 to the magnetic disk apparatus 10 serving as a test object, and the track pitch examination program of the present invention included in the downloaded programs is executed.

Consequently, in step S2, a target position sine-wave path is generated in the unit of a predetermined number of tracks so as to subject the head to tracking control, and the head detection positions are saved. One rotation of the medium is checked in step S3; and, when the head detection positions are saved with respect to one rotation of the medium, the process proceeds to step S4 in which an average calculation of the head detection positions synchronized with one cycle of the target position sine-wave path is performed, and the position fluctuation amount of average head detection positions is detected in step S5. Then, whether the position fluctuation amount detected in step S6 exceeds the threshold value or not is determined, and, when it exceeds that, an abnormal track having a narrow track pitch is determined in step S7, and the track number is registered in the track skip table. Such processes are repeated until completion of all the tracks is determined in step S8; and, when the processes are finished, the program for testing is rewritten to a program for shipment in step S9, and the series of the examination processes is finished.

Figure 10:
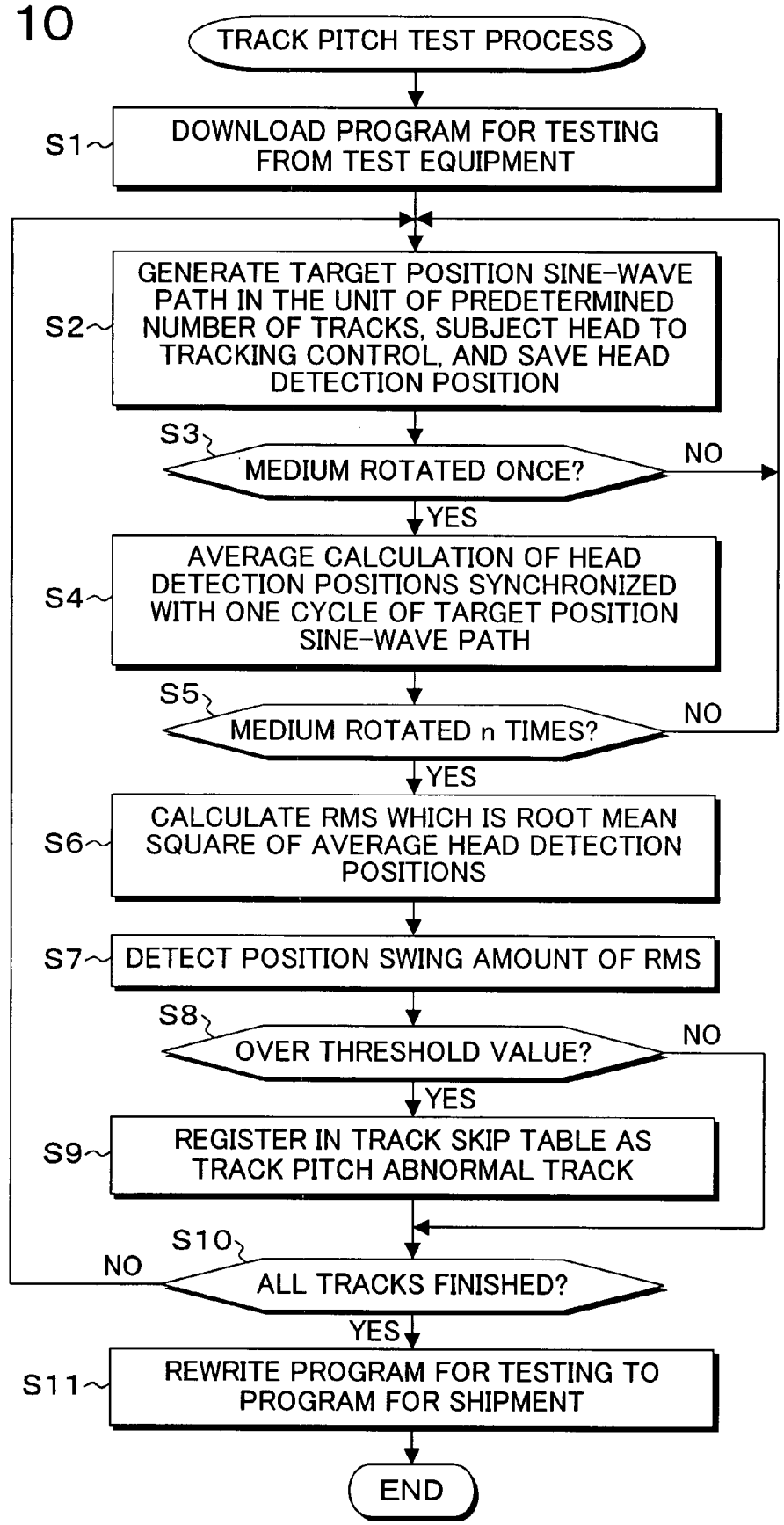
FIG. 10 is a flow chart of a track pitch examination process according to the present invention which determines abnormality from the fluctuation amount of the root mean square of average head detection positions.

FIG. 10 is a flow chart of a track pitch examination process according to the present invention which determines abnormality from the fluctuation amount of the positions by obtaining RMS which is root mean square of average head detection positions in order to further reduce the errors due to other rotation synchronous components or rotation asynchronous components included in the head detection positions tracking the target position sine-wave path in the track pitch test process. In FIG. 10, in step S1, the programs for testing are downloaded from the test equipment 11, and the track pitch examination program included therein is executed, thereby generating a target position sine-wave path in the unit of predetermined number of tracks and subjecting the head to tracking control, and the head detection positions are saved instep S2. Achievement of one rotation of the medium is checked in step S3; and, when one rotation of the medium is achieved, in step S4, an average calculation of the head detection positions synchronized with one cycle of the target position sine-wave path is performed, and the average head detection positions are retained. Subsequently, whether medium has rotated n times or not is checked in step S5, the processes of steps S2 to S4 are repeated until the medium is rotated n times, and n units of average head detection positions are calculated. Subsequently, RMS which is root mean square of the n units of the mean head detection positions are calculated in step S6, the position fluctuation amount is detected from the errors between the calculated RMS and the target position sine-wave path corresponding to one cycle in step S7, and, when it exceeds the threshold value in step S8, the track number is registered in the track skip table as a track pitch abnormal track in step S9. Such processes of steps S2 to S9 are repeated until all the tracks are finished in step S10; and, when the processes of all the tracks are finished, the program for testing is rewritten to a program for shipment in step S11, and the series of the examination processes is finished.

Figure 11:
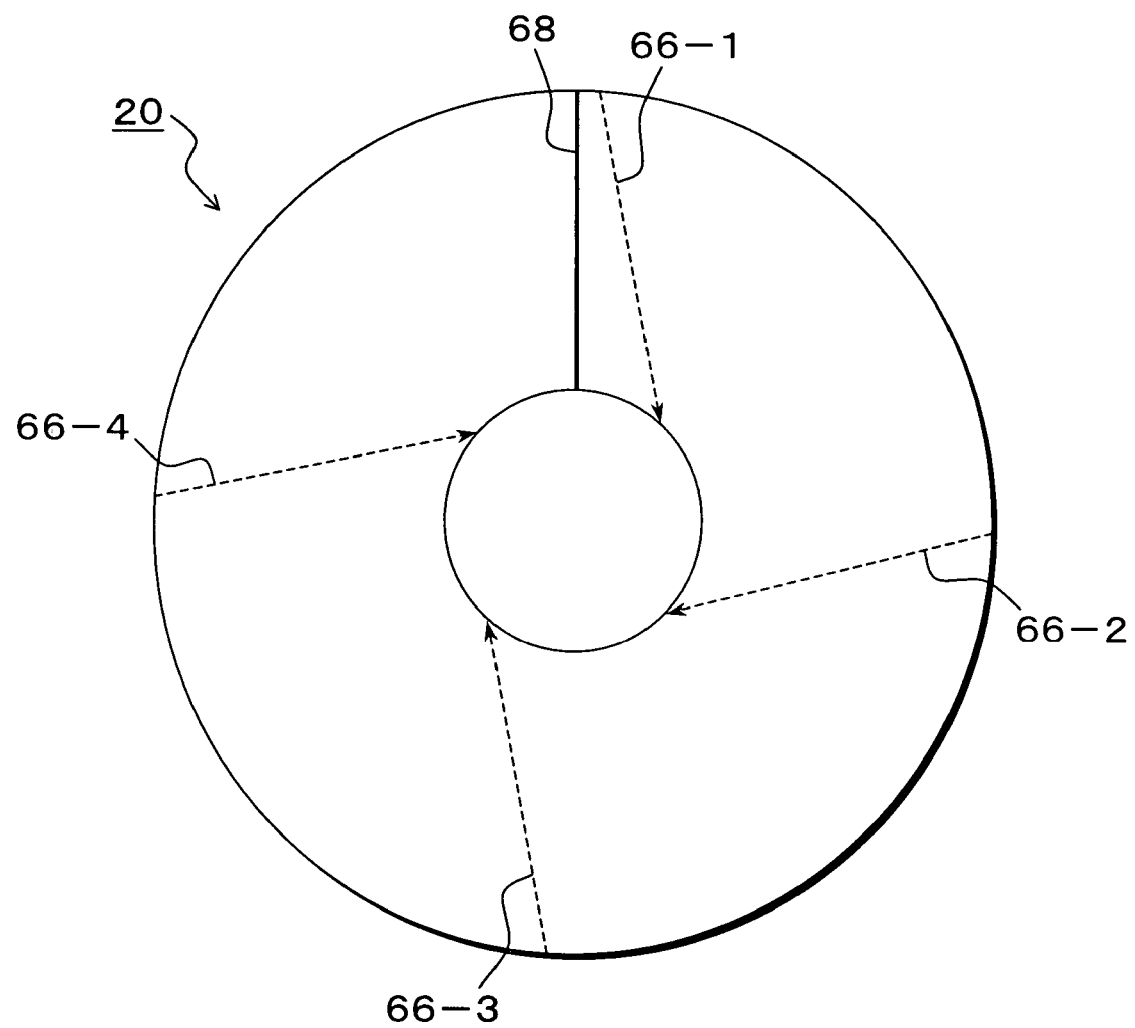
FIG. 11 is an explanatory diagram of target position straight-line paths generated from the outer to the inner of the medium.

FIG. 11 is an explanatory diagram of the target position straight-line path generated from the outer side to the inner side of the medium. In the target position path generation unit 40 provided in the MPU 34 of FIGS. 1A and 1B, as another embodiment, a target position straight-line path which varies the target head position so that it crosses each track interval in certain time between the outermost side of the disk medium and the innermost side of the disk medium is generated, the head is caused to track that, and abnormal tracks having narrow pitches are determined from the fluctuation amount (error) of the head detection position in that course. FIG. 11 shows target position straight-line paths 66-1 to 66-4 of the case in which the head is moved from the outermost side to the innermost side of the disk medium with respect to the rotation of the disk medium 20 by the head actuator, and, in this example, the target position straight-line path is generated four times in one rotation of the medium. Regarding such generation of the target position straight-line path, other than generating it plural times in one rotation of the medium, by moving it at a slower speed, one time of generation of the target position straight-line path from the outermost side to the innermost side of the disk medium may be caused in plural rotation of the medium. When the target position straight-line path is generated from the outermost side to the innermost side of the disk medium in plural rotation of the medium, the straight-line path draws a spiral path which starts from the outermost and ends at the innermost.

Figure 12A:
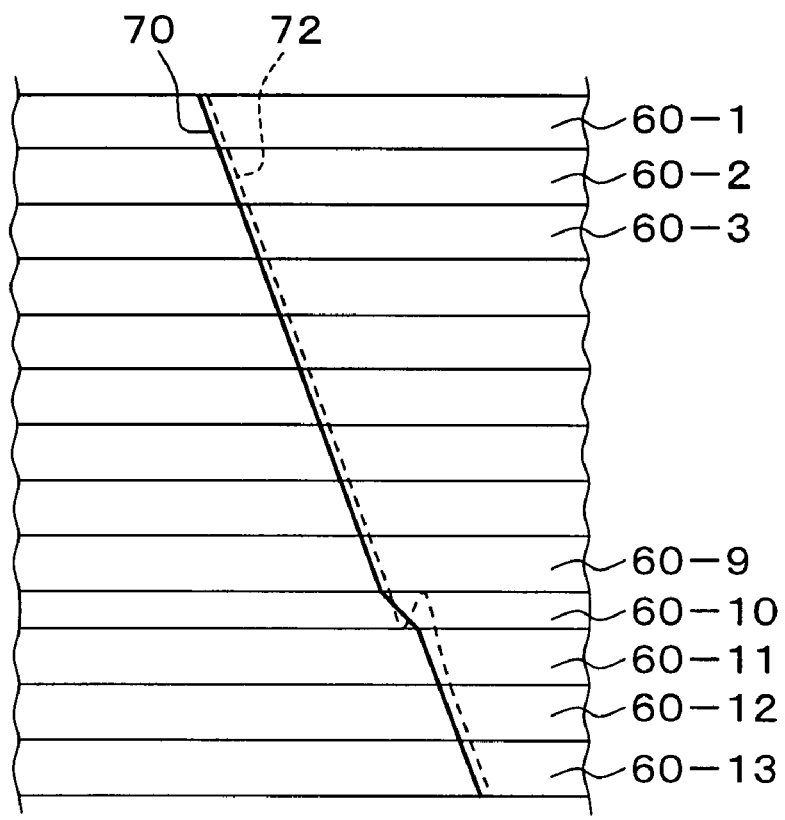
FIGS. 12A and 12B are explanatory diagrams of a target position straight-line path of the case in which an abnormal track having a narrow track pitch is present, head detection positions tracking that, and the fluctuation amount.
Figure 12B:
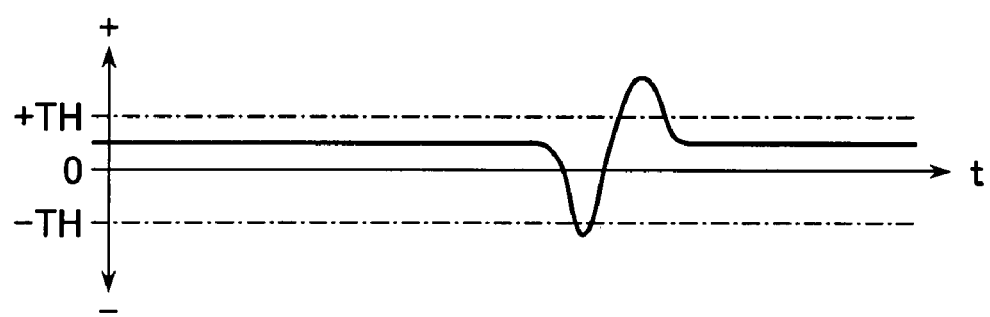

FIGS. 12A and 12B are explanatory diagrams of a target position straight-line path of the case in which an abnormal track having a narrow track pitch is present, head detection positions tracking that, and a fluctuation amount. In FIG. 12A, for example, it is the case in which the target position straight-line path 70 is generated from the boundary of an outermost tack 60-1 serving as a starting point toward the inner, and the head detection positions 72 tracking that appears like the dotted line. Herein, if a track 60-10 is an abnormal track having a narrow track pitch, the moving speed of the target position straight-line path which crosses the interval of the track 60-10 becomes slow along with the reduced width of the track pitch on an actual medium; therefore, as shown by the broken line, the head cannot perform tracking, and the head detection positions 72 cause large hunting.

Therefore, the fluctuation amount shown in FIG. 12B serving as the error of the head detection positions 72 with respect to the target position straight-line path 70 is largely varied at the part corresponding to the abnormal track 60-10, at which the track pitch is narrow, and exceeds the threshold values +TH and −TH; and this is determined, and the track number of the track 60-10 is recorded in the track skip table in the system area of the disk medium.

Figure 13:
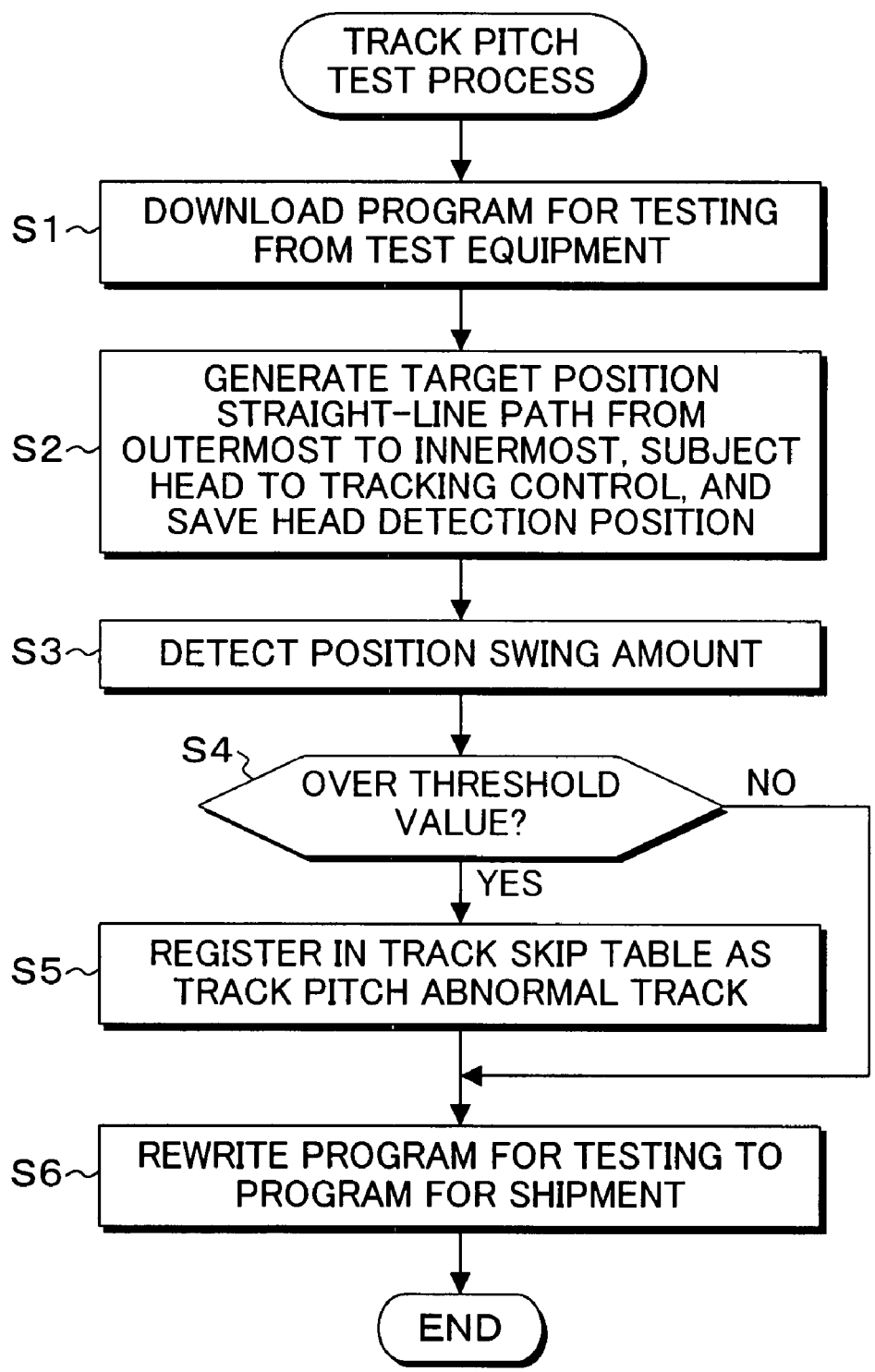
FIG. 13 is a flow chart of a track pitch examination process according to the present invention using a target position straight-line path.

FIG. 13 is a flow chart of a track pitch examination process according to the present invention using a target position straight-line path. In FIG. 13, in step S1, the programs for testing are downloaded from the test equipment 11, and the track pitch examination program included therein is executed, thereby generating a target position straight-line path from the outermost side toward the innermost side of the disk medium so as to subject the head to tracking control, an the head detection positions are saved. Subsequently, the position fluctuation amount is detected as an error of the saved head detection position with respect to the target position straight-line path in step S3, and, when the position fluctuation amount exceeds the threshold values in step S4, the corresponding track number is registered in the track skip table as a track pitch abnormal track in step S5. Then, in step S6, the program for testing is rewritten to a program for shipment, and the series of the examination processes is finished. Herein, in the track pitch examination process in which the target position straight-line path is generated like FIGS. 12A and 12B, the examination of the track pitches with respect to the entire track surface can be completed merely by generating the target position straight-line path one time from the outermost side toward the innermost side of the disk medium, and the examination of the track pitches can be performed in significantly short time for the entire track surface. However, in the track pitch examination process in which the target position straight-line path is generated, as shown in FIG. 11, regarding the path generated in one time, the track pitches are examined merely at a particular part in the disk medium 20. On the other hand, in the track pitch examination process using the target position sine-wave path 54 shown in FIGS. 5A and 5B, the track intervals are examined for all the positions in one track rotation by generating the target position sine-wave paths in the circumferential direction for all the tracks of the disk medium and causing the head to track them. Therefore, also in the case in which a particular part of one track cycle has a part at which the track pitch is narrow, abnormality can be determined when the target position sine-wave path is used, and accuracy of the examination can be increased although the examination process takes time. As a matter of course, also in the track pitch examination process using the target position straight-line path of FIGS. 12A and 12B, when the target position straight-line path 70 is repeatedly generated a plurality of times between the outermost side and the innermost side of the disk medium as shown in FIG. 11, track pitches at plural locations in the circumferential direction of the recording surface of the disk medium 20 can be examined, and partial abnormality of track pitches can be also examined.

Figure 14:
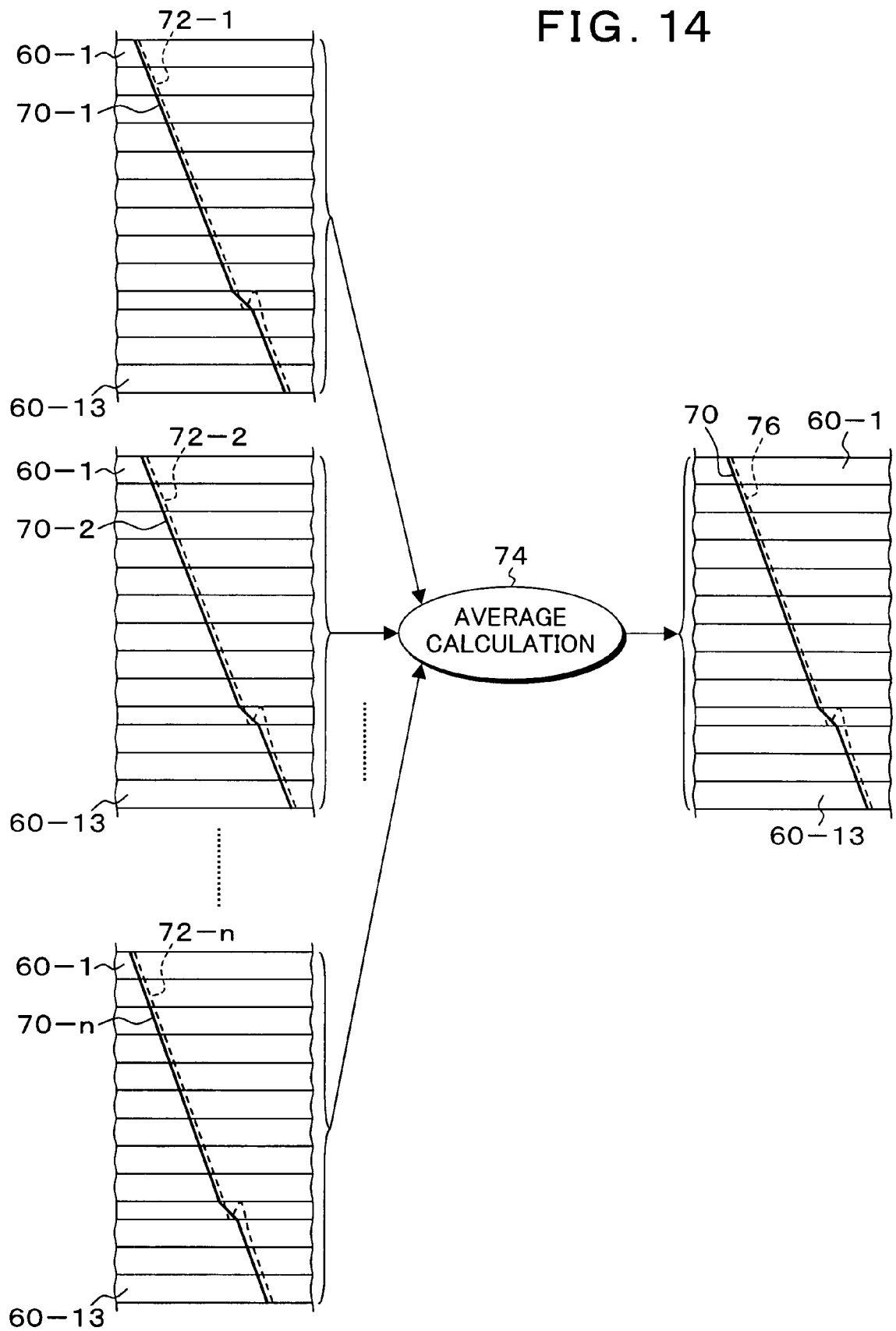
FIG. 14 is an explanatory diagram of a process of averaging head detection positions which are synchronized with a target position straight-line path generated plural times.

FIG. 14 is an explanatory diagram of a process of averaging head detection positions which are obtained by generating the target position straight-line path a plurality of times from the outermost side toward the innermost side of the disk medium. In FIG. 14, for example n times, target position straight-line paths 70-1 to 70-n are generated from the outermost side at an arbitrary position of the disk medium toward the innermost side of the disk medium, and head detection positions 72-1 to 72-n which are respectively obtained in tracking control are retained. Average head detection positions 76 are obtained by performing an average calculation 74 with respect to the head detection positions 72-1 to 72-n which are thus obtained in the plurality of times of the path generation process, and the fluctuation amount is detected as an error with respect to the target position straight-line path 70 and compared with the threshold values, thereby determining an abnormal track having a narrow track pitch. By virtue of such averaging of the head detection positions, errors due to the influence of variation factors which appear at the head detection position in the track pitch examination process can be reduced, and the examination result of the track pitches can be more accurately obtained.

Figure 15:
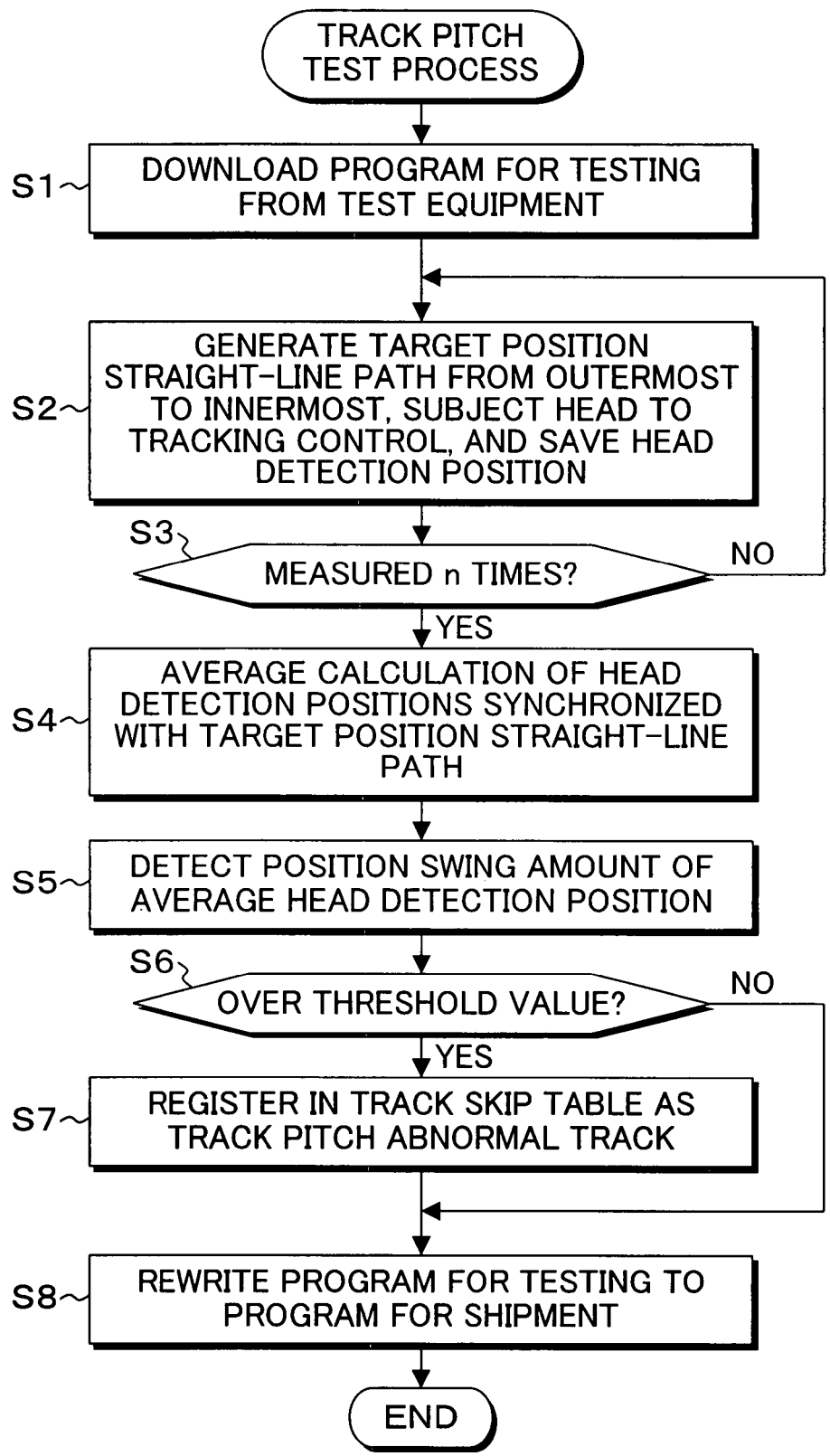
FIG. 15 is a flow chart of a track pitch examination process according to the present invention which determines abnormality from the fluctuation mount of average head detection positions tracking the target position straight-line path of FIG. 14.

FIG. 15 is a flow chart of a track pitch examination process according to the present invention which determines abnormality from the fluctuation amount of average head detection positions tracking the target position straight-line path of FIG. 14. In FIG. 15, in step S1, the programs for testing are downloaded from the test equipment 11, and, when the track pitch examination program included therein is executed, in step S2, a target position straight-line path is generated from the outermost side toward the innermost side of the disk medium so as to subject the head to tracking control, and the head detection positions are obtained and saved.

Whether the number of times of measurement is n, which is determined in advance, or not is checked in step S3, and the process of step S2 is repeated until measurement is performed n times. When n times of the measurement is finished, the process proceeds to step S4 wherein an average calculation of a plurality of head detection positions synchronized with the target position straight-line path, and the position fluctuation amount of the average head detection positions is detected in step S5. When it exceeds the threshold values in step S6, the number of the track exceeding the threshold values is registered in the track skip table as a track pitch abnormal track in step S7.

Then, in step S8, the program for testing is rewritten to a program for shipment, and the series of the examination processes is finished.

Figure 16:
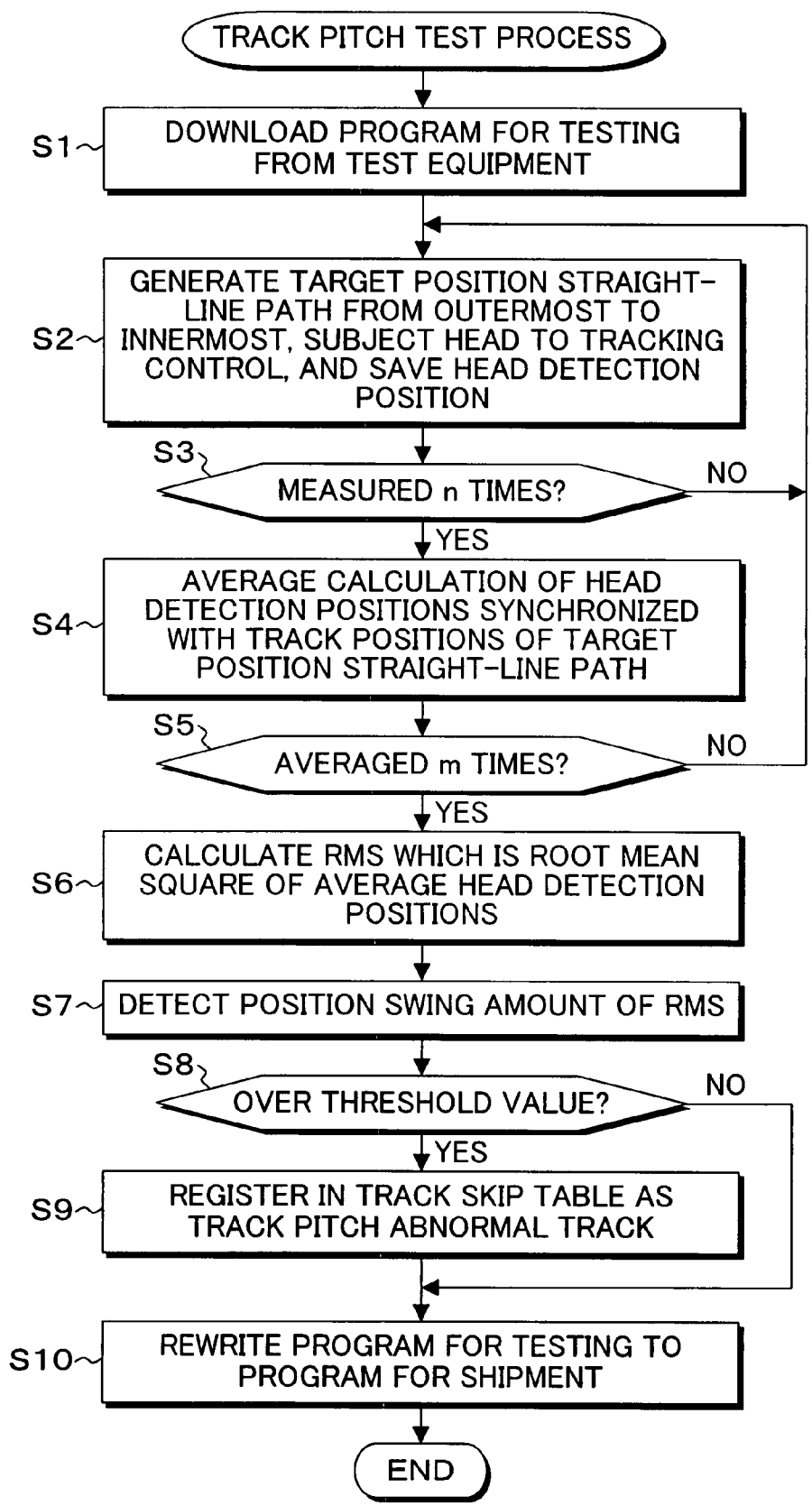
FIG. 16 is a flow chart of a track pitch examination process according to the present invention which determines abnormality from the fluctuation amount of root mean square of average head detection positions.

FIG. 16 is a flow chart of a track pitch examination process according to the present invention which further obtains root mean square with respect to the average head detection positions tracking the target position straight-line path and determines abnormality from the fluctuation amount thereof. In FIG. 16, steps S1 to S4 are same as that of the average head detection process of FIG. 15. In step S5, m times of measurement processes of the average head detection positions are monitored; and, when m times of averaging is checked, the process proceeds to step S6, in which RMS which is root mean square of the m times of average head detection positions is calculated. With respect to the thus-obtained RMS which is root mean square of the average head detection positions, the position fluctuation amount which is an error with respect to the target position straight-line path is detected in step S7; and, with respect to the track which exceeds the threshold values in step S8, the track number thereof is registered in the track skip table as a track pitch abnormal track in step S9, the program for testing is rewritten to a program for shipment in step S10, and the series of the examination processes is finished. When the root mean square of the average head detection positions is obtained in this manner, errors due to the influence of variation factors which appear in the head detection positions in the track pitch examination process can be further reduced, and the examination result of the track pitch can be more accurately obtained. Note that, the above described embodiments take the cases, in which the target position sine-wave path and the target position straight-line path are generated as target position paths, as examples; however, as the target position path, in addition to the sine-wave or straight line, an arbitrary target position path can be generated as long as the path generates target track positions which cross the tracks. The present invention provides the track pitch examination program which is downloaded from the test equipment 11 to the magnetic disk apparatus 10 and executed by the MPU (computer) 34 provided in the magnetic disk apparatus 10, and the track pitch examination program has the processing contents shown in FIG. 7, FIG. 9, FIG. 10, FIG. 13, FIG. 15, and FIG. 16.

The present invention also includes arbitrary modifications that do not impair the objects and advantages thereof and is not limited by the numerical values shown in the above described embodiments.

The invention claimed is:

1. A track pitch examination method of a storage apparatus comprising:
   a target position path generation step of generating a target position path which varies a target track position so that the position crosses a track;
   a head position control step of subjecting a head actuator to feedback control so that a head detection position tracks the target position path; and
   a track pitch determination step of determining track pitch abnormality when an error between the target position path and the head detection position exceeds a predetermined threshold value,
   wherein
   in the target position path generation step, as the target position path, a target position sine-wave path, which has an amplitude of the width of one or plural tracks and causes a target track position to undergo sine variation in plural cycles per one rotation of a medium, is generated;
   in the head position control step, the head actuator is subjected to feedback control so that the head detection position tracks the target position sine-wave path; and
   in the track pitch determination step, the error between the target position sine-wave path and the head detection position is detected, and track pitch abnormality is determined with respect to a track at which the error exceeds a predetermined threshold value.

2. The track pitch examination method of the storage apparatus according to claim 1, wherein,
   in the target position path generation step, each of target track positions of the target position sine-wave path is generated in synchronization with a servo frame; and
   in the track pitch determination step, the head detection position synchronized with each of the target track positions is extracted so as to detect the error, and track pitch abnormality is determined with respect to the track at which the error exceeds a predetermined threshold value.

3. The track pitch examination method of the storage apparatus according to claim 1, wherein,
   in the target position path generation step, each of target track positions of the target position sine-wave path is generated in synchronization with a servo frame;
   in the track pitch determination step, the head detection positions synchronized with the target track positions are extracted with respect to one rotation of the medium and averaged, and track pitch abnormality is determined with respect to a track at which an error between the average head detection position and the target position sine-wave path exceeds a predetermined threshold value.

4. The track pitch examination method of the storage apparatus according to claim 3, wherein, in the track pitch determination step, after the head detection positions synchronized with the target track positions of the target position sine-wave path are extracted with respect to one rotation of the medium and averaged, root mean square of the average head detection position obtained in plural rotations of the medium is obtained, and track pitch abnormality is determined with respect to a track at which an error between the root mean square and the target position sine-wave path exceeds a predetermined threshold value.

5. The track pitch examination method of the storage apparatus according to claim 1, wherein,
in the target position path generation step, as the target position path, a target position straight-line path which varies a target track position so that the position crosses each track interval in certain time between an outermost side and an innermost side of a medium is generated;
in the head position control step, the head actuator is subjected to feedback control so that the head detection position tracks the target position straight-line path; and
in the track pitch determination step, track pitch abnormality is determined with respect to a track at which an error between the target position straight-line path and the head detection position exceeds the threshold value.

6. The track pitch examination method of the storage apparatus according to claim 5, wherein,
in the target position path generation step, a target position straight-line path is generated plural times between the outermost side and the innermost side of the medium; and,
in the track pitch determination step, the head detection positions obtained in plural times of generation of the target position straight-line path are averaged, and track pitch abnormality is determined with respect to a track at which an error between the target position straight-line path and the average head detection position exceeds a predetermined threshold value.

7. The track pitch examination method of the storage apparatus according to claim 6, wherein,
in the track pitch determination step, the head detection positions each of which is obtained in each of the predetermined number of times of generation of the target position straight-line path are averaged, root mean square of the average head position which is obtained by repeating the predetermined number of times of path generation is obtained, and track pitch abnormality is determined with respect to a track at which an error between root mean square and the target position straight-line path exceeds a predetermined threshold value.

8. The track pitch examination method of the storage apparatus according to claim 1, wherein the abnormal track determined in the track pitch determination step is recorded in a medium as track skip information.

9. A computer-readable storage medium which stores a program downloaded from a test equipment to a storage apparatus characterized by causing a computer of the storage apparatus to execute
a target position path generation step of generating a target position path which varies a target track position so that the position crosses a track;
a head position control step of subjecting a head actuator to feedback control so that a head detection position tracks the target position path; and
a track pitch determination step of determining track pitch abnormality when an error between the target position path and the head detection position exceeds a predetermined threshold value,
wherein
the target position path generation unit generates, as the target position path, a target position sine-wave path which has an amplitude of the width of one or plural tracks and causes a target track position to undergo sine variation in plural cycles per one rotation of a medium;
the head position control unit subjects the head actuator to feedback control so that the head detection position tracks the target position sine-wave path; and
the track pitch determination unit detects the error between the target position sine-wave path and the head detection position and determines track pitch abnormality with respect to a track at which the error exceeds a predetermined threshold value.

10. A storage apparatus comprising:
a target position path generation unit which generates a target position path which varies a target track position so that the position crosses a track;
a head position control unit which subjects a head actuator to feedback control so that a head detection position tracks the target position path; and
a track pitch determination unit which determines track pitch abnormality when an error between the target position path and the head detection position exceeds a predetermined threshold value,
wherein
the target position path generation unit generates, as the target position path, a target position sine-wave path which has an amplitude of the width of one or plural tracks and causes a target track position to undergo sine variation in plural cycles per one rotation of a medium;
the head position control unit subjects the head actuator to feedback control so that the head detection position tracks the target position sine-wave path; and
the track pitch determination unit detects the error between the target position sine-wave path and the head detection position and determines track pitch abnormality with respect to a track at which the error exceeds a predetermined threshold value.

11. The storage apparatus according to claim 10, wherein,
the target position path generation unit generates each of target track positions of the target position sine-wave path in synchronization with a servo frame; and
the track pitch determination unit extracts the head detection position synchronized with each of the target track positions so as to detect the error and determines track pitch abnormality with respect to the track at which the error exceeds a predetermined threshold value.

12. The storage apparatus according to claim 10, wherein,
the target position path generation unit generates each of target track positions of the target position sine-wave path in synchronization with a servo frame;
the track pitch determination unit extracts and averages the head detection positions synchronized with the target track positions with respect to one rotation of the medium, and determines track pitch abnormality with respect to a track at which an error between the average head detection position and the target position sine-wave path exceeds a predetermined threshold value.

13. The storage apparatus according to claim 12, wherein the track pitch determination unit extracts and averages the head detection positions synchronized with the target track positions of the target position sine-wave path with respect to one rotation of the medium, then, obtains root mean square of the average head detection position obtained in plural rotations of the medium, and determines track pitch abnormality with respect to a track at which an error between the root mean square and the target position sine-wave path component exceeds a predetermined threshold value.

14. The storage apparatus according to claim 10, wherein, the target position path generation unit generates, as the target position path, a target position straight-line path which varies a target track position so that the position crosses each track interval in a certain time between an outermost side and an innermost side of a medium;

the head position control unit subjects the head actuator to feedback control so that the head detection position tracks the target position straight-line path; and the track pitch determination unit determines track pitch abnormality with respect to a track at which an error between the target position straight-line path and the head detection position exceeds the threshold value.

15. The storage apparatus according to claim 14, wherein, the target position path generation unit generates a target position straight-line path plural times between the outermost side and the innermost side of the medium; and, the track pitch determination unit averages the head detection positions obtained in plural times of generation of the target position straight-line path and determines track pitch abnormality with respect to a track at which an error between the target position straight-line path and the average head detection position exceeds a predetermined threshold value.

16. The storage apparatus according to claim 15, wherein, the track pitch determination unit averages the head detection positions each of which is obtained in each of the predetermined number of times of generation of the target position straight-line path, obtains root mean square of the average head position which is obtained by repeating the predetermined number of times of path generation, and determines track pitch abnormality with respect to a track at which an error between root mean square and the target position straight-line path exceeds a predetermined threshold value.

17. The storage apparatus according to claim 16, wherein, the abnormal track determined by the track pitch determination unit is recorded in a medium as track skip information.

* * * * *